March 11, 1941.  J. T. BRUEGGEMAN  2,234,852
SAFETYPIN
Filed March 27, 1940
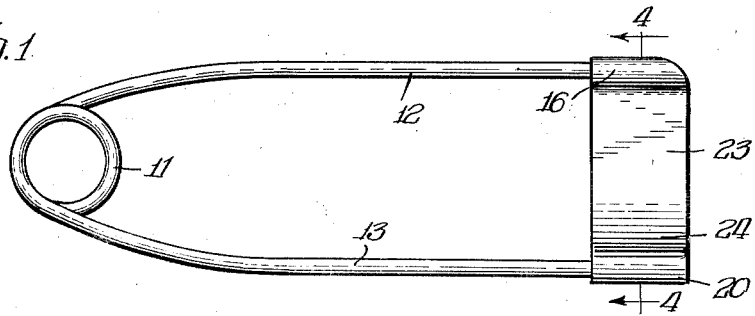
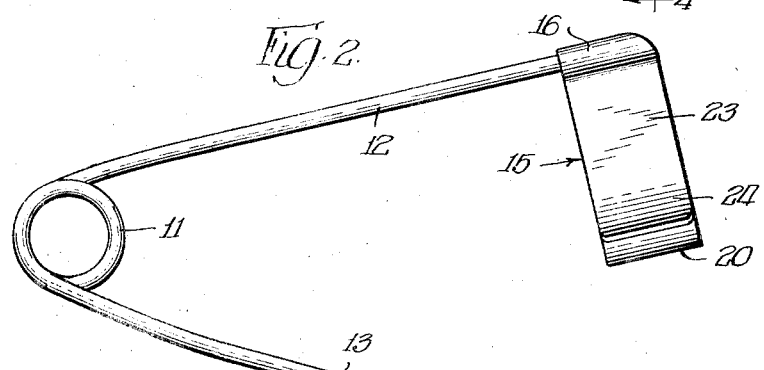
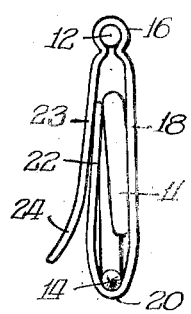
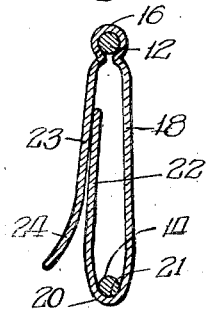
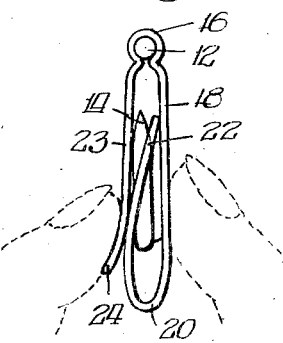
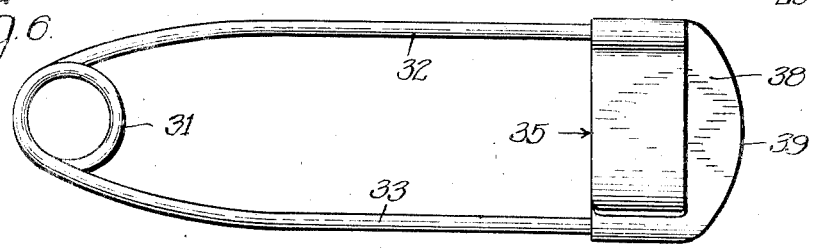
INVENTOR.
John T. Brueggeman,
BY
ATTYS.

Patented Mar. 11, 1941

2,234,852

UNITED STATES PATENT OFFICE 2,234,852

SAFETYPIN

John T. Brueggeman, Winnetka, Ill.

Application March 27, 1940, Serial No. 326,145

2 Claims. (Cl. 24—156)

The invention relates to improvements in safety pins and has for its object to provide a safety pin in which the pin point will be effectively locked against accidental displacement.

More specifically the invention has for an object to provide an improved safety pin of the class having a guard or shield for housing the resilient pin point and which guard or shield is constructed and arranged to prevent accidental displacement of the pin point while permitting easy engagement thereof and also disengagement with ease and safety when it is desired to do so.

Another object of the invention is to provide a safety pin wherein the guard for the resilient pin point must be manipulated in order to release the pin point.

A feature of the invention consists in the construction of the guard, particularly the resilient keeper and actuating member having overlapping relation with the keeper. When pressure is applied to the sides of the guard the actuating member causes the resilient keeper to bend inwardly at its upper end and form a path for effecting release of said pin point. Accordingly, another object of the invention is to provide a guard for a safety pin having means for effectively locking the pin point and which will require two positive acts for releasing said point, first, movement of the pin point by compression on this part of the safety pin, and then the application of pressure to the sides of the guard to form a path for effecting release of the point.

Another object of the invention is to provide a safety pin which will be comparatively simple in construction, embodying relatively few parts, and which can be manufactured in quantity with very little expense.

With these and various other objects in view, the invention may consist of certain novel features of construction and operation, as will be more fully described and particularly pointed out in the specification, drawing and claims appended hereto.

In the drawing which illustrates an embodiment of the invention, and wherein like reference characters are used to designate like parts—

Figure 1 is a side elevational view showing a safety pin embodying the features of the invention;

Figure 2 is a side elevational view showing the safety pin of Figure 1 with the resilient pin point disengaged;

Figure 3 is an end view showing the construction of the guard;

Figure 4 is a sectional view through the guard taken substantially along line 4—4 of Figure 1;

Figure 5 is an end view showing the position assumed by the resilient keeper, actuating member and pin point when pressure is applied to the sides of the guard for effecting release of said point; and Figure 6 is an elevational view showing a modification of the invention wherein the safety pin has a modified form of guard.

Referring to the drawing, the body portion of the present pin consists of a single piece of spring wire or similar material having its intermediate portion bent to form a coil 11 whereby two members 12 and 13 extend laterally from the coil. The member 13 has its outer free end sharpened to provide a piercing point 14, as clearly shown in Figure 2, and said member may be considered the movable member since the same has movement with respect to the stationary part 12 of the safety pin. The guard or shield designated in its entirety by numeral 15 is fixedly secured to the outer free end of member 12.

Figures 3, 4 and 5 show the construction of the guard which may be formed from a single strip of flat metal, preferably spring metal or other material having some inherent resiliency. Intermediate its length the strip is bent upon itself to form the circular portion 16 which securely unites the guard to the free end of member 12. The part 16 is in the form of a tubular socket into which is inserted and suitably secured as by welding or otherwise the free end of wire 12. Depending from socket 16 on one side thereof is the backing portion of the guard identified by numeral 18. The metal of the guard is additionally bent at its lower end as at 20 to form a circular cup or recess 21 for receiving the resilient pin point 14. The bending of the metal at this point also forms with guard 18 a resilient keeper 22, said keeper extending upwardly for almost the distance of the backing member. As shown in the drawing the height of the keeper 22 is more than half the height of the backing member 18 and may be said to approximate about three-fourths of the height of said member. This feature of the guard is important since the resilient keeper must have a height sufficient to provide locking means with the overlapping actuating member 23. As a result the resilient pin point is retained within the guard. The keeper 22 normally tends to assume an outward position where the upper portion at least is in contact with the actuating member 23 and therefore the guard provides means for effectively locking the movable part 13 of the safety pin against accidental displacement.

The actuating member 23 depends from portion 16 on the side opposite the backing member 18 and said actuating member, in accordance with the invention, is provided with an outwardly flaring lower end indicated by numeral 24. Said flaring end performs a dual function. In the first place, it facilitates engagement of the resilient pin point since it tends to direct or guide the point between the actuating member 23 and the resilient keeper 22. Its more important function, however, is for effecting release of the pin point. This can best be understood by reference to Figure 5 which shows the manner of applying pressure to the sides of the guard in order to position the resilient keeper to effect release of the movable member 13 of the pin. The backing member is in engagement with the thumb and the forefinger has contact with the actuating member and particularly with the outwardly flared lower end 24 thereof. With the guard located between the thumb and forefinger pressure may be applied thereto and as a result of the construction of the resilient keeper 22 and the actuating member 23 the upper portion of said keeper is caused to move inwardly into contact with the inner surface of the backing member. As a result a path is provided for the sharpened point 14 of the movable member of the pin. Of course, the movable member of the pin must be compressed so as to move the point 14 from its seat 21 in a direction upwardly toward the upper portion of the guard. The natural tendency of the pin point is to move down and the path provided therefor by the resilient keeper in connection with the actuating member directs said point so as to release the pin.

An important feature of the invention is the construction of the guard whereby pressure on the sides of the same produces flexing of the resilient keeper so as to release the pin point. The result is accomplished in a large measure by the flaring end 24 of the actuating member 23. Normally this flaring end is spaced from the resilient keeper as shown by Figures 3 and 4 and by said spacing a path is provided which functions to direct the pin point when the same is to be engaged by the guard. However, by pressing on the sides of the guard pressure is concentrated by said flaring end on the lower portion of the keeper as in Figure 5 and the upper end of the keeper is caused to move in a direction toward the back 18 whereby a path is formed to allow the resilient and movable point 13 to release itself from the guard. It is only necessary in this stage in the operation for the operator to reduce the pressure on the sides of the guard since the pin point naturally tends to move downwardly and outwardly for complete disengagement.

It will be clear from the foregoing that accidental displacement of the pin point is impossible in the improved safety pin of the invention since two positive acts are required for releasing said pin point. Also when engaged as in Figures 1, 3 and 4 the action of the keeper in flexing outward into contact with the actuating member securely locks the resilient pin point within the guard and compressing the said pin point is not sufficient to cause disengagement. The guard must be manipulated as described. Accordingly the pin of the invention provides an effective lock although disengagement can be accomplished with ease and safety when desired and likewise engagement of the pin point is just as easy.

Referring more particularly to the resilient keeper of the guard it will be observed that the opening provided thereby is located at the end of the loop adjacent the stationary member 12. This requires that the movable member 13 be compressed to its full extent in order to release the resilient pin point 14 and it is likewise necessary to compress the movable member to the same extent for engagement. The loop formed by the backing portion 18, the socket 16 and resilient keeper 22 is normally closed by the actuating member 23 and the opening in said loop can only be rendered effective for releasing the pin point by manipulating the guard to cause flexing of the keeper as described. The construction of the guard is comparatively simple and the pin as a whole embodies relatively few parts which makes possible manufacture in quantity with very little expense.

In the modification of Figure 6 the body of the pin consists of spring wire or other suitable metal, the same as in Figure 1, having an intermediate coil 31 and laterally extending members 32 and 33, the latter having movement with respect to 32 and forming the resilient pin point. The guard 35 embodies the features shown in Figures 3, 4 and 5, the only difference in construction having to do with the backing portion of the guard, namely, 38, which has a rounded head portion 39 materially adding to the attractive appearance of this part of the safety pin.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A safety pin including a body portion of wire providing a stationary member and a relatively movable pin point, a guard fixed to the end of the stationary member for retaining the movable pin point and for locking the same against accidental displacement, said guard including a backing portion depending from the stationary member, a resilient keeper bent from said portion and extending upwardly in spaced relation for the greater part of the length of the portion to form an elongated loop having an opening adjacent the stationary member, and an actuating member also depending from the stationary member and overlapping the resilient keeper to thereby close said opening, said actuating member having a flaring end to form with the keeper an entering recess, and said actuating member enabling release of the movable pin point from the guard when pressure is applied thereto by causing the free end of the resilient keeper to flex in a direction toward the backing portion, whereby a path is provided for directing the movable pin point between the keeper and said actuating member.

2. A safety pin including a body portion of wire providing a stationary member and a relatively movable pin point, a guard fixed to the end of the stationary member for retaining the movable pin point and for locking the same against accidental displacement, said guard including a backing portion depending from the stationary member, a resilient keeper bent from said portion to form a loop for holding the movable pin point, said keeper extending upwardly in spaced relation to the backing portion and having a length only slightly less than the backing portion to form a relatively narrow opening adjacent the stationary member, and an actuating member also depending from the stationary member and overlapping the resilient keeper to thereby close said opening, said actuating member having a flaring lower end to form with the keeper an entering recess, and said actuating member enabling release of the movable pin point from the guard when pressure is applied thereto by causing the free end of the resilient keeper to flex in a direction toward the backing portion, whereby a path is provided for directing the movable pin point betwen the keeper and said actuating member.

JOHN T. BRUEGGEMAN.